(12) United States Patent
Imai et al.

(10) Patent No.: US 11,233,906 B2
(45) Date of Patent: Jan. 25, 2022

(54) ELECTRONIC APPARATUS AND NON-TRANSITORY COMPUTER READABLE RECORDING MEDIUM THAT RECORDS CONTROL PROGRAM

(71) Applicant: KYOCERA DOCUMENT SOLUTIONS INC., Osaka (JP)

(72) Inventors: Satoshi Imai, Osaka (JP); Hiroshi Nakamura, Osaka (JP); Aya Kamakura, Osaka (JP); Hiroshi Yoshimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/909,395

(22) Filed: Jun. 23, 2020

(65) Prior Publication Data

US 2020/0412883 A1     Dec. 31, 2020

(30) Foreign Application Priority Data

Jun. 27, 2019 (JP) .............................. JP2019-119954

(51) Int. Cl.
*H04N 1/00* (2006.01)
*G06F 11/07* (2006.01)

(52) U.S. Cl.
CPC ..... *H04N 1/00037* (2013.01); *G06F 11/0706* (2013.01); *H04N 1/00029* (2013.01)

(58) Field of Classification Search
None
See application file for complete search history.

(56) References Cited

U.S. PATENT DOCUMENTS

| 5,012,280 | A | * | 4/1991 | Tsutsumi | G03G 15/5016 |
| | | | | | 345/173 |
| 5,467,449 | A | * | 11/1995 | Gauronski | H04N 1/32646 |
| | | | | | 399/42 |
| 2008/0052719 | A1 | * | 2/2008 | Briscoe | H04L 41/0856 |
| | | | | | 718/104 |
| 2008/0062458 | A1 | * | 3/2008 | Inui | B41J 11/485 |
| | | | | | 358/1.15 |
| 2011/0010718 | A1 | * | 1/2011 | Kondo | G06F 11/0751 |
| | | | | | 718/102 |

(Continued)

FOREIGN PATENT DOCUMENTS

| JP | 2002320066 | * 10/2002 | ............... G06F 3/12 |
| JP | 2009271680 A | 11/2009 | |

*Primary Examiner* — Beniyam Menberu
(74) *Attorney, Agent, or Firm* — Li & Cai Intellectual Property (USA) Office

(57) ABSTRACT

A storage device stores, for each of one or more function expansion applications, the hardware component necessary for operation of the function expansion application. A control circuit is configured to detect that there is a failure in any of the plurality of hardware components, determine whether or not there is the function expansion application that needs, for operation thereof, the hardware component from which a failure has been detected, and perform control so that an operation mode is switched to a first degeneracy mode in which the detected hardware component is not used where there is no function expansion application that needs the detected hardware component, and the other hardware components are used.

3 Claims, 4 Drawing Sheets

(56) References Cited

U.S. PATENT DOCUMENTS

| | | | |
|---|---|---|---|
| 2011/0219271 A1* | 9/2011 | Kaneko | G06F 16/192 |
| | | | 714/47.1 |
| 2014/0089725 A1* | 3/2014 | Ackaret | G06F 11/1482 |
| | | | 714/6.1 |
| 2016/0239391 A1* | 8/2016 | Sagiyama | G06F 11/1484 |
| 2016/0321139 A1* | 11/2016 | Kitamoto | G06F 11/00 |
| 2020/0050510 A1* | 2/2020 | Chien | G06F 11/0793 |

* cited by examiner

| Name of function expansion application | Name of hardware component ||||
|---|---|---|---|---|
| | Finisher | Liquid crystal screen | HDD | ... |
| Skin changing application | Not necessary | Necessary (allow) | Not necessary | ... |
| User authentication application | Necessary (allow) | Not necessary | Necessary (not allow) | ... |
| ... | ... | ... | ... | ... |
| ... | ... | ... | ... | ... |
| ... | ... | ... | ... | ... |

ELECTRONIC APPARATUS AND NON-TRANSITORY COMPUTER READABLE RECORDING MEDIUM THAT RECORDS CONTROL PROGRAM

CROSS-REFERENCE TO RELATED PATENT APPLICATION

This application claims the benefit of Japanese Priority Patent Application JP 2019-119954 filed Jun. 27, 2019, the entire contents of which are incorporated herein by reference.

FIELD OF THE DISCLOSURE

The present disclosure relates to an electronic apparatus. The present disclosure further relates to a non-transitory computer readable recording medium that records a control program to be executed by a controller circuit of the electronic apparatus.

FIELD OF THE DISCLOSURE

There is a technology for simplifying a replacement work of replacing an electronic apparatus such as a printer and an MFP (Multi-Functional Peripheral).

SUMMARY OF THE DISCLOSURE

It is desirable to reduce downtime when a hardware failure occurs in an electronic apparatus having a function of additionally installing a function expansion application.

According to an embodiment of the present disclosure, there is provided an electronic apparatus, including:
a plurality of hardware components;
a storage unit that stores, for each of one or more function expansion applications, the hardware component necessary for operation of the function expansion application; and
a control unit configured to
  detect that there is a failure in any of the plurality of hardware components,
  determine whether or not there is the function expansion application that needs, for operation thereof, the hardware component from which a failure has been detected, and
  perform control so that an operation mode is switched to a first degeneracy mode in which the detected hardware component is not used where there is no function expansion application that needs the detected hardware component, and the other hardware components are used.

According to another embodiment of the present disclosure, there is provided a control program of an electronic apparatus, which causes a controller circuit of an electronic apparatus that includes a plurality of hardware components to
  perform control to store, for each of one or more function expansion applications, the hardware component necessary for operation of the function expansion application,
  perform control to detect that there is a failure in any of the plurality of hardware components,
  perform control to determine whether or not there is the function expansion application that needs, for operation thereof, the hardware component from which a failure has been detected, and
  perform control so that an operation mode is switched to a first degeneracy mode in which the detected hardware component is not used where there is no function expansion application that needs the detected hardware component, and the other hardware components are used.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 is a conceptual diagram describing stored content of a storage device.

DETAILED DESCRIPTION OF THE EXEMPLARY EMBODIMENTS

Hereinafter, an embodiment of the present disclosure will be described with reference to the drawings.

1. ELECTRONIC APPARATUS

Figure 1:
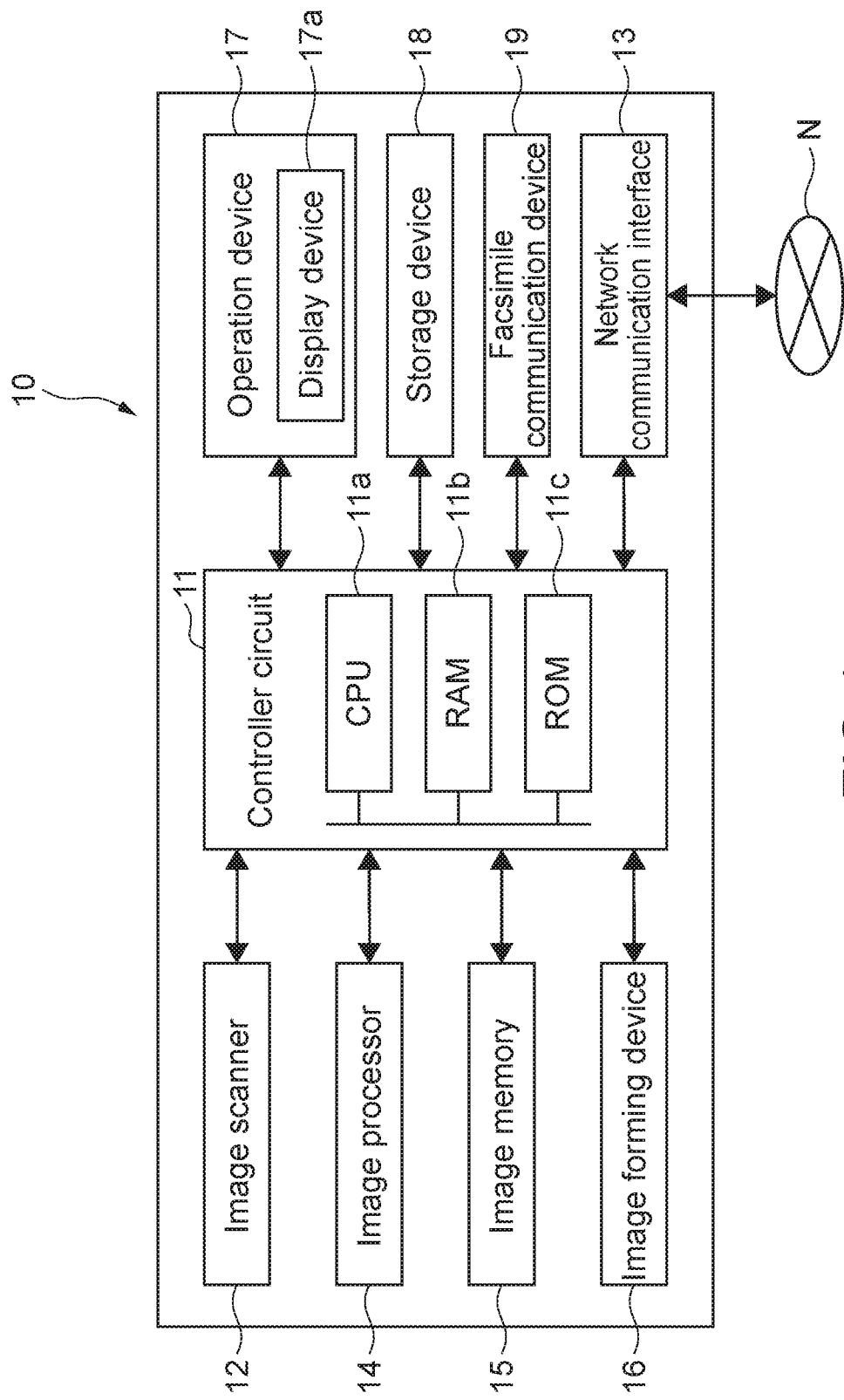
FIG. 1 shows a hardware configuration of an electronic apparatus according to an embodiment of the present disclosure.

FIG. 1 shows a hardware configuration of an electronic apparatus according to an embodiment of the present disclosure.

An electronic apparatus 10 includes a controller circuit 11. The controller circuit 11 includes a CPU (Central Processing Unit) 11a that is a processor, a RAM (Random Access Memory) 11b, a ROM (Read Only Memory) 11c that is a memory, dedicated hardware circuits, and the like and performs overall operational control of the electronic apparatus 10. The CPU 11a loads information processing programs stored in the ROM 11c in the RAM 11b and executes the information processing programs. The ROM 11c statically stores programs executed by the CPU 11a, data, and the like. The ROM 11c is an example of a non-transitory computer readable recording medium.

The controller circuit 11 is connected to an image scanner 12, an image processor 14 (including GPU (Graphics Processing Unit)), an image memory 15, an image forming device 16 (printer), an operation device 17 including a display device 17a (touch panel), a large volume nonvolatile storage device 18 such as an HDD (Hard Disk Drive) or an SSD (Solid State Drive), a facsimile communication device 19, a network communication interface 13, and the like. The controller circuit 11 performs operational control of the respective devices connected thereto and sends/receives signals and data to/from those devices. The operation device 17 (touch panel) is one mode of an input device. A sound input device including a microphone may be provided as an input device.

2. FUNCTIONAL CONFIGURATION OF ELECTRONIC APPARATUS

Figure 2:
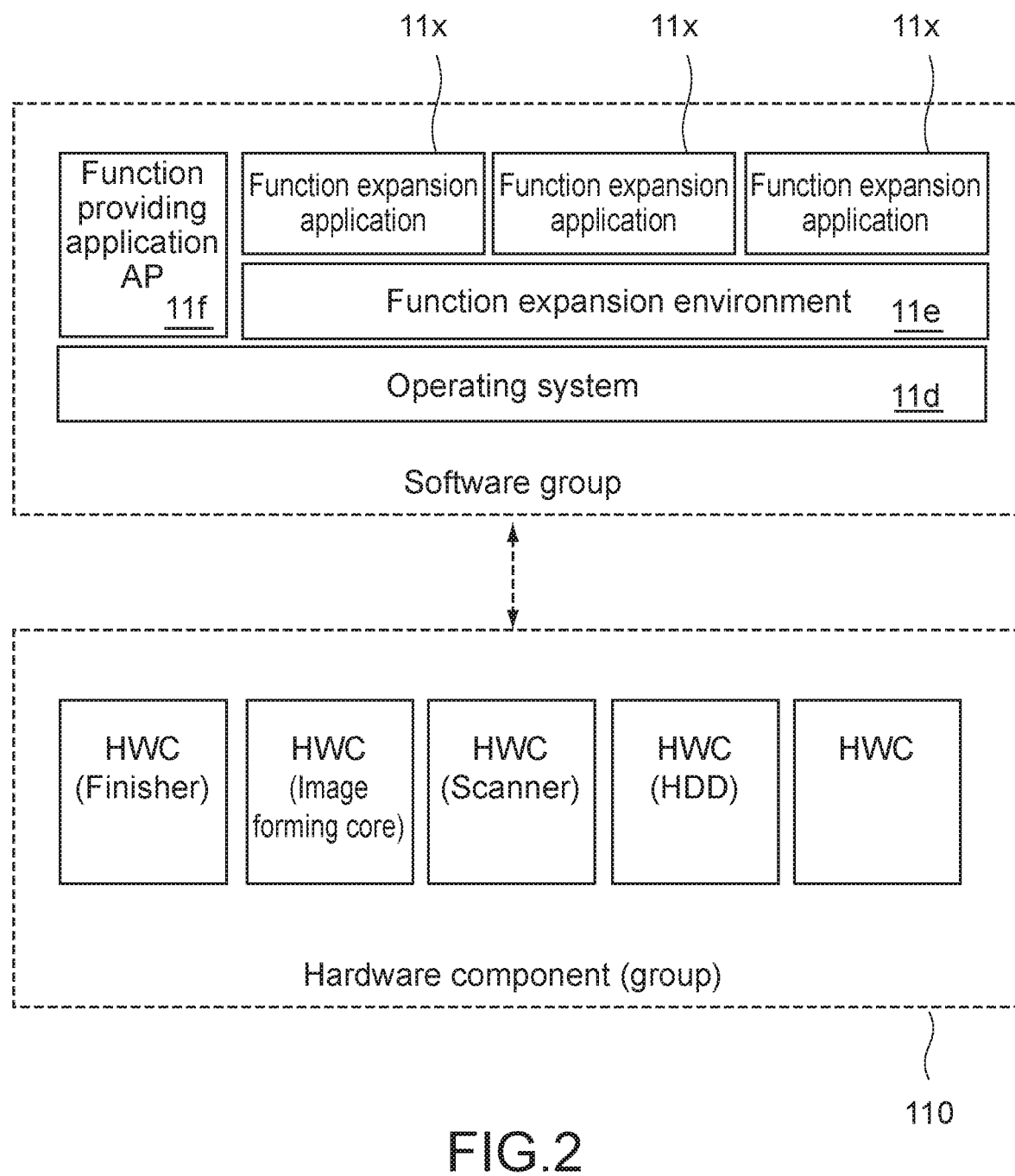
FIG. 2 is a conceptual diagram describing a functional configuration of the electronic apparatus.

FIG. 2 is a conceptual diagram describing a functional configuration of the electronic apparatus.

The electronic apparatus 10 is, for example, an MFP having multiple printer and scanner functions. In order to provide these functions, the electronic apparatus 10 includes a plurality of hardware components 110.

For example, the image forming device 16 includes a plurality of hardware components. In this embodiment, the image forming device 16 includes a "finisher" and an "image forming core". In addition, the image forming device 16 may include a "paper feeder". The image scanner 12 includes a "scanner". The storage device 18 includes an HDD (Hard Disk Drive)".

Further, the electronic apparatus 10 has, as the above-mentioned information processing programs, an operating system 11d, a function expansion environment 11e, a function providing application 11f, and one or more function expansion programs 11x.

The operating system 11d is software for performing basic input/output of the electronic apparatus 10. The function providing application 11f is an application for providing a basic function of the electronic apparatus 10. The operating system 11d and the function providing application 11f are software programs that are installed in the electronic apparatus 10 as standard.

The function expansion environment 11e has a function of additionally installing the function expansion programs 11x for realizing functions that the main body does not have. As a result, a user of the electronic apparatus 10 is can freely add a desired function to the electronic apparatus 10.

The function expansion programs 11x can be freely designed by a developer. One of the typical function expansion programs 11x is a "skin changing application" capable of customizing the display screen of the display device 17a.

Other examples thereof include a "user authentication application". This application is used for billing by linking with an authentication server in a local area network for authentication and recording who did what.

3. STORED CONTENT OF STORAGE DEVICE

FIG. 3 is a conceptual diagram describing stored content of a storage device.

The storage device 18 stores, for each of the function expansion programs 11x, the hardware component 11 necessary for the operation as "hardware information 181 at the time of failure". Note that the storage location of the hardware information 181 at the time of failure is not limited to the storage device 18, and may be the RAM 11b or the ROM 11c.

For example, in the "skin changing application", a "finisher" and an "HDD" are set as not necessary for operation, and a "liquid crystal screen" is set as necessary for operation. Further, for example, in the "user authentication application", a "liquid crystal screen" is set as not necessary for operation, and a "finisher" and an "HDD" are set as necessary for operation.

Further, the storage device 18 stores, in the hardware information 181 at the time of failure, setting as to whether to allow, in the case where the hardware component 110 necessary for operation has failed, the operation stop of the function expansion programs 11x as "allowance information 182 at the time of failure".

For example, in the "skin changing application", the "liquid crystal screen" is set as necessary for operation but is set to "allow" itself not to be used at the time of failure. Further, for example, in the "user authentication application", although a "finisher" and an "HDD" are set as necessary for operation, the "finisher" is set to "allow" itself not to be used at the time of failure while the "HDD" is set to not "allow" itself not to be used at the time of failure.

Since the "skin changing application" changes the skin of the user interface displayed on the liquid crystal screen of the display device 17a, the liquid crystal screen is necessary for operation. By not using the liquid crystal screen, also the function of the "skin changing application" is stopped. However, this does not adversely affect the overall operation of the electronic apparatus 10.

While the "user authentication application" cannot fully demonstrate the functions unless the "finisher" operates normally when a paper output tray is set for each user, some users think that paper output does not need to be made for each user. Meanwhile, in the case where the hard disk drive has failed, it is not appropriate if it becomes possible to use functions such as copying, which do not use the HDD, without being able to record user authentication information and who has been charged for how much. In the case where the HDD has failed, it is better to stop the functions of the user authentication application and other hardware components 110 should not be allowed to continue to be used. For this reason, it is set not to allow the "separation due to failure".

4. OPERATION FLOW OF ELECTRONIC APPARATUS

Figure 4:
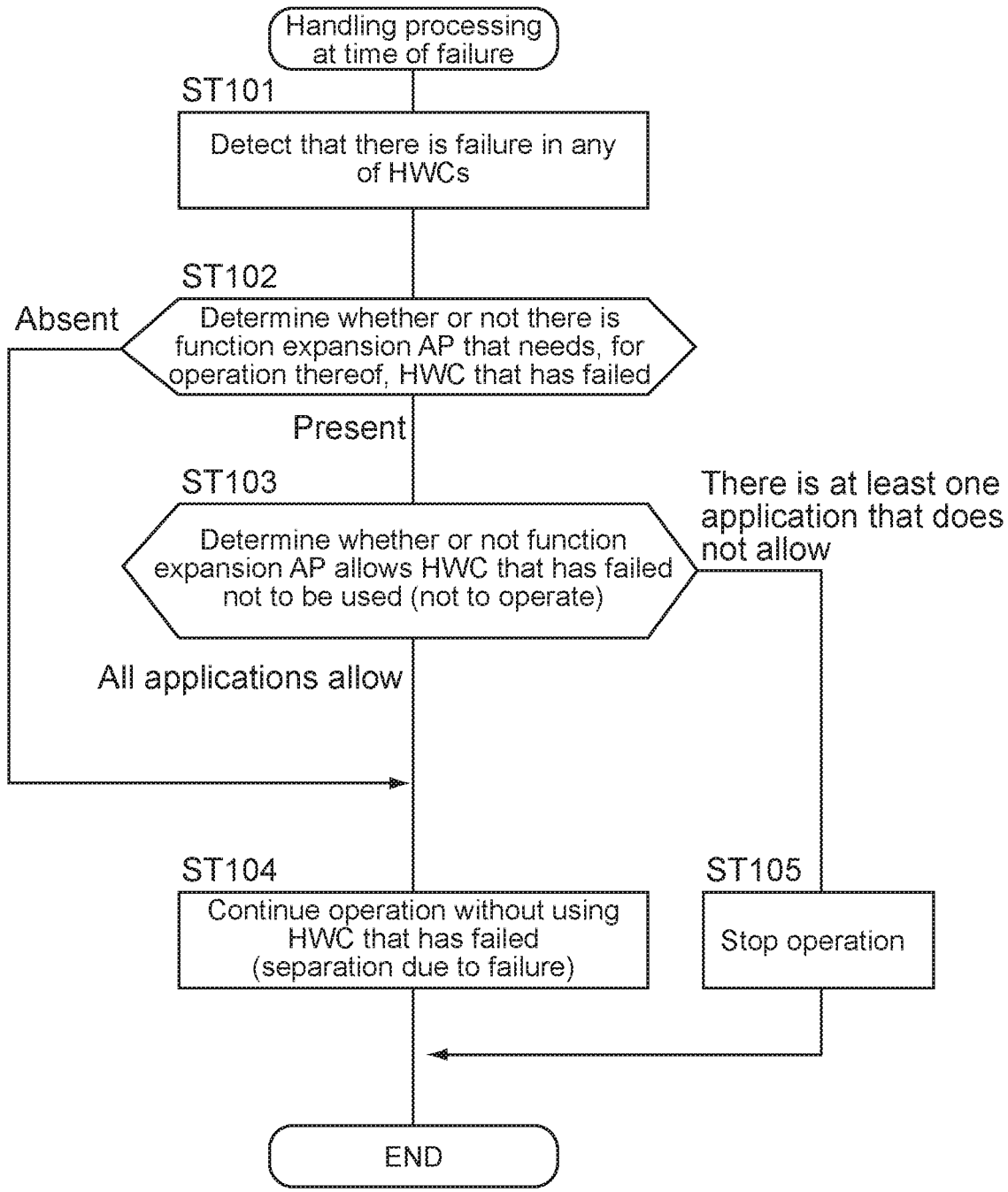
FIG. 4 shows an operation flow of the electronic apparatus.

FIG. 4 shows an operation flow of the electronic apparatus.

(ST101) The controller circuit 11 detects, by a notification signal from various modules, that there is an abnormality such as a failure and a detect in any of the hardware components 110.

(ST102) In this case, the controller circuit 11 determines, on the basis of the above-mentioned hardware information 181 at the time of failure, whether or not there is the function expansion program 11x that needs, for the operation thereof, the hardware component 110 that has failed. In the case where there is no such a function expansion program 11x, the processing proceeds to ST104.

(ST103) In the case where there is the function expansion program 11x necessary for operation, the controller circuit 11 determines, on the basis of the above-mentioned allowance information 182 at the time of failure, whether or not the function expansion program 11x allows the hardware component 110 that has failed not to be used (not to operate). In the case where there is a plurality of function expansion programs 11x, whether or not all of the plurality of function expansion programs 11x allow the hardware component 110 that has failed not to be used (not to operate) is determined.

(ST104) In the case where there is no function expansion program 11x necessary for operation or where there is such a function expansion program 11x and the function expansion program 11x allows the hardware component 110 that has failed not to be used, the mode of the controller circuit 11 shifts to an operation mode in which an operation without using the hardware component 110 that has failed is continued. Such an operation mode will be referred to as "first degeneracy mode".

Specifically, the controller circuit 11 requests a system status holding unit (not shown) that holds the state (normal/failed) of each of the hardware components 110 to change the value. After that, each function receives the notification of the change in value, and changes the behavior. As a result, the "separation due to failure" of the hardware components 110 is realized.

(ST105) In the case where there is at least one function expansion programs 11x that does not allow the function stop among the function expansion programs 11x necessary for operation, the controller circuit 11 performs control to enter the operation mode in which not only the operation of the hardware component 110 that has failed but also the operations of a plurality of hardware components 110 including this are stopped. This operation mode will be referred to as "second degeneracy mode". In this operation mode, for example, an error screen, e.g., "Call a service person because it is out of order", is displayed while many functions such as a printer function and a facsimile transmission function are limited.

The software performs control, which is an excessive measure in many cases, so that all of the functions of the electronic apparatus 10 are stopped in the case where a failure has occurred in any of the hardware components 110 because there is a concern that any of the function expansion programs 11x, which uses the hardware component 110 that has failed, is affected. There are not many cases when the entire system is desired to be stopped in the case where the finisher has failed. In this regard, in this embodiment, the developer of the function expansion program 11x specifies, in advance, hardware information necessary for operation and whether or not the "separation due to failure" of the hardware is allowed.

The setting relating to the above-mentioned "separation due to failure" is distributed while being described in the profile attached to the function expansion program 11x, and is stored in the storage device 18 when the function expansion program 11x is installed in the electronic apparatus 10.

In accordance with this embodiment, the separation due to failure is performed at the time of failure and the controller circuit can be used by degeneracy driving (operate in the first degeneracy mode) in more cases than before. As a result, it is possible to minimize the risk that the business of the user is stopped.

Note that even with the same application, the way of thinking about the priority for usage and function differs depending on the user. For this reason, the hardware information 181 at the time of failure and the allowance information 182 at the time of failure may be changed by the user (administrator of the electronic apparatus 10) at the time of installation. Even in the case where the user authentication application becomes unusable, the electronic apparatus 10 may continue the operation in the first degeneracy mode even in the case where the hard disk drive has failed as long as a paper and a pen are placed beside the electronic apparatus 10 and charging is possible by self-declaration.

6. CONCLUSION

Typically, the shorter the downtime (period during which the user cannot use the electronic apparatus) of the electronic apparatus, the better. A typical technology reduces the downtime associated with replacement by simplifying work. In addition to the downtime associated with replacement, there is downtime due to a hardware failure. It is also desirable to reduce the downtime dur to a hardware failure.

However, in an electronic apparatus having a function of additionally installing a function expansion application, the software performs control so that all of the functions of the electronic apparatus are stopped in the case where a failure has occurred in hardware because there is a possibility that a function expansion application, which uses the hardware, has been installed.

(1) In view of the circumstances as described above, in this embodiment, in an electronic apparatus having a function of additionally installing a function expansion application, a hardware component necessary for operation is stored for each function expansion application, whether or not there is a function expansion application that needs, for the operation thereof, a hardware component is determined in the case where the hardware component has failed, and the hardware component is not used (separation due to failure) in the case where there is no function expansion application that needs the hardware component. As a result, it is possible to increase the availability and reduce the downtime at the time of a hardware failure.

(2) In this embodiment, allowance information at the time of failure, which indicates that the operation of the application may be stopped in the case where a hardware component has failed although the hardware component is necessary for operation, is stored for each function expansion application, whether or not it is allowed, in the case where a hardware component has failed and there is a function expansion application that needs, for the operation thereof, the hardware component, not to use the hardware component that has failed is determined, and the above-mentioned separation due to failure is performed in the case where it is allowed. As a result, it is possible to further increase the availability and reduce the downtime at the time of a hardware failure.

(3) In this embodiment, in the case where there is a function expansion application that needs, for the operation thereof, the hardware component that has failed and does not allow the hardware component not to be used, the controller circuit enters an operation mode in which a plurality of hardware components including the hardware component that has failed is not used. As a result, it is possible to prevent a possible problem from occurring.

Although embodiments and modified examples of the present technology have been described above, the present technology is not limited to the above-mentioned embodiments and various modifications can be made without departing the essence of the present technology.

It should be understood by those skilled in the art that various modifications, combinations, sub-combinations and alterations may occur depending on design requirements and other factors insofar as they are within the scope of the appended claims or the equivalents thereof.

What is claimed is:
1. An electronic apparatus, comprising:
a plurality of hardware components;
a storage unit that stores, for each of one or more function expansion applications, the hardware component necessary for operation of the function expansion application; and
a control unit configured to
  detect that there is a failure in any of the plurality of hardware components,
  determine whether or not there is the function expansion application that needs, for operation thereof, the hardware component from which a failure has been detected, and
  perform control so that an operation mode is switched to a first degeneracy mode in which the detected hardware component is not used where there is no function expansion application that needs the detected hardware component, and the other hardware components are used, wherein
the storage unit stores, for each of the function expansion applications, allowance information at the time of failure indicating whether or not function expansion application allows, where the hardware component necessary for operation has failed, the hardware component not to be used, and
the control unit is further configured to determine, where there is the function expansion application that needs, for operation thereof, the hardware component from which a failure has been detected, whether or not there is the function expansion application that does not allow the hardware component not to be used, on a basis of the allowance information at the time of failure of the function expansion application, and perform control, where there is no function expansion application that does not allow the hardware component not to be used, so that the operation of the function expansion application is stopped and then the operation mode is switched to the first degeneracy mode.

2. The electronic apparatus according to claim 1, wherein the control unit is configured to perform control, where there is the function expansion application that needs, for operation thereof, the hardware component from which a failure has been detected and there is the function expansion application that does not allow the hardware component not to be used, so that the operation mode is switched to a second degeneracy mode in which the hardware component from which a failure has been detected and the other hardware components are not used.

3. A non-transitory computer readable recording medium that records a control program of an electronic apparatus, which causes a controller circuit of an electronic apparatus that includes a plurality of hardware components to perform control to store, for each of one or more function expansion applications, the hardware component necessary for operation of the function expansion application, perform control to detect that there is a failure in any of the plurality of hardware components, perform control to determine whether or not there is the function expansion application that needs, for operation thereof, the hardware component from which a failure has been detected, perform control so that an operation mode is switched to a first degeneracy mode in which the detected hardware component is not used where there is no function expansion application that needs the detected hardware component, and the other hardware components are used, perform control to store, for each of the function expansion applications, allowance information at the time of failure indicating whether or not function expansion application allows, where the hardware component necessary for operation has failed, the hardware component not to be used, perform control to determine, where there is the function expansion application that needs, for operation thereof, the hardware component from which a failure has been detected, whether or not there is the function expansion application that does not allow the hardware component not to be used, on a basis of the allowance information at the time of failure of the function expansion application, and perform control, where there is no function expansion application that does not allow the hardware component not to be used, so that the operation of the function expansion application is stopped and then the operation mode is switched to the first degeneracy mode.

* * * * *